United States Patent

Catallo et al.

Patent Number: 5,867,817
Date of Patent: Feb. 2, 1999

[54] SPEECH RECOGNITION MANAGER

[75] Inventors: Leo R. Catallo, Mercer Island; John A. Malley, Seattle, both of Wash.

[73] Assignee: Virtual Vision, Inc., Redmond, Wash.

[21] Appl. No.: 699,632

[22] Filed: Aug. 19, 1996

[51] Int. Cl.$^6$ .................................................. G10L 9/06
[52] U.S. Cl. ........................................ 704/255; 704/275
[58] Field of Search .................................. 395/2.59, 2.52, 395/2.62; 704/255, 251, 275, 256, 257, 252, 270, 237, 235, 200, 276

[56] References Cited

U.S. PATENT DOCUMENTS

| | | | |
|---|---|---|---|
| 4,277,644 | 7/1981 | Levinson et al. | 395/2.59 |
| 4,866,778 | 9/1989 | Baker | 395/2.68 |
| 5,384,892 | 1/1995 | Strong | 395/2.52 |
| 5,425,128 | 6/1995 | Morrison | 395/2.52 |
| 5,668,928 | 9/1997 | Groner | 704/243 |

*Primary Examiner*—Richemond Dorvil
*Attorney, Agent, or Firm*—McAndrews, Held, & Malloy, Ltd.

[57] ABSTRACT

A speech recognition manager receives representations of one or more words from a speech decoding system and interprets the received words based upon the current context state so as to provide extremely accurate, flexible, extendable and scalable speech recognition and interpretation. The speech recognition manager limits the number of words that the speech decoding system can recognize in a given context state in order to increase the speed and accuracy of the speech recognition process. Whenever the context state changes, the manager loads a new list of words that can be recognized for the new context state into the speech decoding system so that while the speed and accuracy of the speech recognition process is increased, the total grammatical structure recognized can be easily increased as well.

40 Claims, 9 Drawing Sheets

Fig. 5

| | SYNTAX FILE: VISUAL . STS | q = VISUAL |
|---|---|---|
| 120 | S → { & ZOOM / & HIDE / & PAN / &GET / & HOME } | |
| 121 | & ZOOM → { ZOOM } { & IN / & OUT } | |
| 122 | & IN → { IN / IN MORE / MORE } | |
| 123 | & OUT → { OUT / OUT MORE / LESS } | |
| 124 | & HIDE → { HIDE / BLANK } | |
| 125 | & PAN → { PAN / MOVE } { & NORTH / & SOUTH / & EAST / & WEST } | |
| 126 | & NORTH → { UP / NORTH / TOP } | |
| 127 | & SOUTH → { DOWN / SOUTH / BOTTOM } | |
| 128 | & EAST → { RIGHT / EAST } | |
| 129 | & WEST → { LEFT / WEST } | |
| 130 | & GET → { SHOW / GIVE / GET } | |
| 131 | & HOME → { DONE / FINISHED / GO } | |

Fig. 6

| MEANING MAP | q = VISUAL | | ACTION CARRIED OUT AS A RESULT OF σ |
|---|---|---|---|
| PARSE TAG SEQUENCE | INPUT COMMAND σ | | |
| & ZOOM & OUT | ZOOM DECREASE | — — | SCALE DISPLAYED IMAGE UP BY FACTOR OF 2 |
| & ZOOM & IN | ZOOM INCREASE | — — | SCALE DISPLAYED IMAGE DOWN BY FACTOR OF 2 |
| & HIDE | HIDE | — — | STOP DISPLAYING IMAGE |
| & PAN & NORTH | PAN 0° | — — | SCROLL IMAGE TO SHOW MORE IN NORTH |
| & PAN & SOUTH | PAN 180° | — — | SCROLL IMAGE TO SHOW MORE IN SOUTH |
| & PAN & EAST | PAN 90° | — — | SCROLL IMAGE TO SHOW MORE IN EAST |
| & PAN & WEST | PAN 270° | — — | SCROLL IMAGE TO SHOW MORE IN WEST |
| & GET | SHOW | — — | DISPLAY IMAGE CURRENTLY HIDDEN |
| & HOME | TRANSITION TO SELECT STATE | — — | CHANGE STATE |

| SYNTAX FILE "ROBOT . STS" | q = ROBOT |
|---|---|
| S = { & GET / & MOVE / & RELEASE / & HOME / & HELP / & BOOLEAN } ||
| & GET ⟶ { GET / FETCH / PICK / GRAB / TAKE } ||
| & MOVE ⟶ { MOVE / GO / PAN } { & DIRECTION } ||
| & DIRECTION ⟶ { & UP / & DOWN / & RIGHT / & LEFT } ||
| & UP ⟶ { UP / NORTH } ||
| & DOWN ⟶ { DOWN / SOUTH } ||
| & RIGHT ⟶ { RIGHT / EAST } ||
| & LEFT ⟶ { LEFT / WEST } ||
| & RELEASE ⟶ { DROP / RELEASE / LET GO / LEAVE } ||
| & HOME ⟶ { DONE / GO } ||
| & HELP ⟶ { HELP } ||
| & BOOLEAN ⟶ { & YES / & NO } ||
| & YES ⟶ { YES / OK / CLOSE / THANK YOU } ||
| & NO ⟶ { NO / NEGATIVE / NOT YET } ||

Fig. 9

| MEANING MAP | q = ROBOT | | ACTION CARRIED OUT AS A RESULT OF σ |
|---|---|---|---|
| PARSE TAG SEQUENCE | INPUT COMMAND σ | | |
| & GET | RETRIEVE | --- | ARM DROPS DOWN, FINGERS CLOSE, & ARM RAISES |
| & MOVE & UP | MOVE 0° | --- | ARM MOVES NORTH |
| & MOVE & DOWN | MOVE 180° | --- | ARM MOVES SOUTH |
| & MOVE & RIGHT | MOVE 90° | --- | ARM MOVES EAST |
| & MOVE & LEFT | MOVE 270° | --- | ARM MOVES WEST |
| & RELEASE | RELEASE | --- | ARM DROPS, FINGERS OPEN, ARM RAISES |
| & HELP | HELP | | DISPLAY LIST OF TYPICAL UTTERANCE AND ACTION |
| & YES | YES | | CLOSE HELP DISPLAY |
| & NO | NO | | MAINTAIN HELP DISPLAY VISIBLE |
| & HOME | TRANSITION TO SELECT STATE | | CHANGE STATE |

Fig. 11

| SYNTAX FILE | q = SELECT |
|---|---|
| PARSE TAG SEQUENCE | INPUT COMMAND |
| & FILE | TRANSITION TO FILE STATE |
| & ROBOT | TRANSITION TO ROBOT STATE |
| & ADMINISTRATION | TRANSITION TO ADMIN. STATE |
| & DATA BASE | TRANSITION TO D. B. QUERY STATE |
| & AURAL | TRANSITION TO AURAL STATE |
| & VISUAL | TRANSITION TO VISUAL STATE |
| & HELP | HELP |
| & SUSPEND | SUSPEND |
| & RESUME | RESUME |
| & EXIT | EXIT |

Fig. 12

| MEANING MAP | STATE q |
|---|---|
| UTTERANCE | INPUT COMMAND $\sigma$ |
| $U_a$ | $\sigma_1$ |
| $U_b$ | $\sigma_1$ |
| $U_c$ | $\sigma_1$ |
| ⋮ | ⋮ |
| $U_m$ | $\sigma_2$ |
| $U_n$ | $\sigma_2$ |
| $U_o$ | $\sigma_2$ |
| ⋮ | ⋮ |
| $U_x$ | $\sigma_n$ |
| $U_y$ | $\sigma_n$ |

$U_I$: $U_a, U_b, U_c, \ldots$
$U_{II}$: $U_m, U_n, U_o, \ldots$
$U_N$: $U_x, U_y$

SPEECH RECOGNITION MANAGER

FIELD OF INVENTION

The present invention relates to a speech recognition manager for a head mounted display system that is responsive to speech for essentially hands free operation. The present invention, more particularly, relates to a speech recognition manager that determines the current context state of communications with the user to assign different meanings to the same spoken word used in different context states so as to provide fast and accurate speech recognition and interpretation.

BACKGROUND OF THE INVENTION

Speech decoding systems are known that include an acoustic processing circuit for converting to a digital electrical signal, a spoken utterance, i.e. speech in the form of a word, phrase or sentence, as picked up by a microphone. One such system is the PE 500 from Speech Systems, Inc. which utilizes a phonetic encoder to convert the digital signals representing the utterance into a sequence of phoneme codes. Each phoneme is the smallest unit of speech that can be used to distinguish one sound from another. The sequence of phoneme codes is decoded into a literal string of words using a phonetic dictionary and a syntax file. The phonetic dictionary correlates phoneme code sequences to words. The syntax file contains a number of production rules that define an allowable grammatical structure and limit the words that can be recognized in different parts of the grammatical structure. The syntax file utilizes intermediate labels or parse tags wherein the syntax file includes information correlating an utterance to parse tags and/or literal word strings. A parse tag identifies a category of words grouped according to meaning and grammatical or syntactical structure. For example, the parse tag "writing tool" may identify a category of words or utterances including "pen, pencil, marker, . . . " A parse tag sequence is a sequence or pattern of one or more parse tags defining grammatical or syntactical structure. An example of a parse tag sequence is: "writing action; writing tool," where "writing tool" is the parse tag discussed above and "writing action" is a parse tag that identifies the utterances "pick up, drop, sharpen, . . . " This parse tag sequence defines the grammatical structure for the phrase "sharpen the pencil". In operation, the phonetic stream is analyzed to identify the syntactical or grammatical structure of the phoneme code sequence by matching the phoneme code sequence with one or more grammatical production rules stored in the syntax file to provide a basis for the possible phoneme code to utterance matches. The output of the speech decoding system is both a literal string corresponding to the decoded utterance such as "sharpen the pencil" plus the grammatical structure used in the decoding process including the production rules, parse tags, etc. The use of the syntax file increases the efficiency of the phonetic decoding process. However, this system still has problems with both speed and accuracy due to the large size of the syntax file employed. For example, the syntax file is typically tailored to a user so that if the user is a doctor, the syntax file contains common medical terms or if the user is a lawyer, the syntax file contains common legal terms. If greater range of expression is desired for diverse applications, the size of the syntax file must be increased. However, the speed and accuracy of the system decreases as the size and complexity of the syntax file increases.

Another speech decoding system utilizes a template matching algorithm that compares a digital representation of the aural signature, i.e. analog waveform representation of detected speech, to a database of word signatures and selects the closest match. An example of a system of this type is Dragon Dictate from Dragon Systems, Inc. This type of system requires unnatural pauses between words so that the system can distinguish when a word begins and ends. This system also requires an intended user to speak the same words repeatedly so that the system can obtain numerous waveform samples representing the same word. Not only is this process extremely time-consuming and tiresome, but it also makes the system user specific. Further like other prior speech decoding systems discussed above, as the size of the database increases, errors in decoding occur more frequently and the speed of this system decreases.

SUMMARY OF THE INVENTION

In accordance with the present invention, the disadvantages of prior speech decoding systems have been overcome. A speech recognition manager of the present invention is utilized with a speech decoding system to increase the accuracy and speed of the speech recognition process. The speech recognition manager receives representations of one or more words from a speech decoding system and interprets the received words based upon the current context state so as to provide extremely accurate speech recognition and interpretation. The speech recognition manager of the present invention limits the number of words that the speech decoding system can recognize in a given context state in order to increase the speed and accuracy of the speech recognition and interpretation process. Whenever the context state changes, the manager loads a new list of words that can be recognized for the new context state into the speech decoding system so that while the speed and accuracy of the speech recognition process is increased, the total vocabulary recognized can be easily increased as well.

More particularly, the speech recognition manager of the present invention provides input commands to a processing system that operates in accordance with one or more application programs that are responsive to the received input commands. In the past these input commands were typically generated by the user actuating keys on a keyboard and/or mouse. In accordance with the present invention, the input commands are generated from utterances i.e. words spoken by the user. The speech recognition manager receives representations of one or more words from a speech decoding system or acoustic processor that is responsive to sound to generate the word representations. The speech recognition manager includes a memory for storing data for a number of context states. The manager determines a current context state and is responsive to the data stored in the memory for assigning to a word representation received from the acoustic processor, a first meaning represented by a first input command when the current context state is determined to be a first context state. The manager however assigns to that same word representation a second meaning represented by a second input command when the current context state is determined to be a second, i.e. different, context state. The present invention thus recognizes that the same word can have different meanings depending upon the context in which the word is used during conversation. Thus, the speech recognition manager assigns different meanings to the same spoken word used in different context states so as to provide extremely accurate speech recognition and interpretation.

These and other advantages and novel features of the present invention, as well as details of an illustrated embodiment thereof, will be more fully understood from the following description and drawings.

BRIEF DESCRIPTION OF THE DRAWING

FIG. 5 is a chart illustrating the structure of a syntax file for a VISUAL context state;

FIG. 6 is a chart illustrating a meaning map for the VISUAL context state as well as the actions carried out as a result of a given input command identified in the meaning map;

FIG. 8 is a chart illustrating the syntax file for the ROBOT context state;

FIG. 9 is a chart illustrating the meaning map for the ROBOT context state as well as the actions carried out as a result of a given input command identified in the meaning map;

FIG. 11 is a chart illustrating the syntax file for the SELECT context state; and FIG. 12 is a chart illustrating a second embodiment of a meaning map for a context state q.

DESCRIPTION OF THE PREFERRED EMBODIMENT

Figure 1:
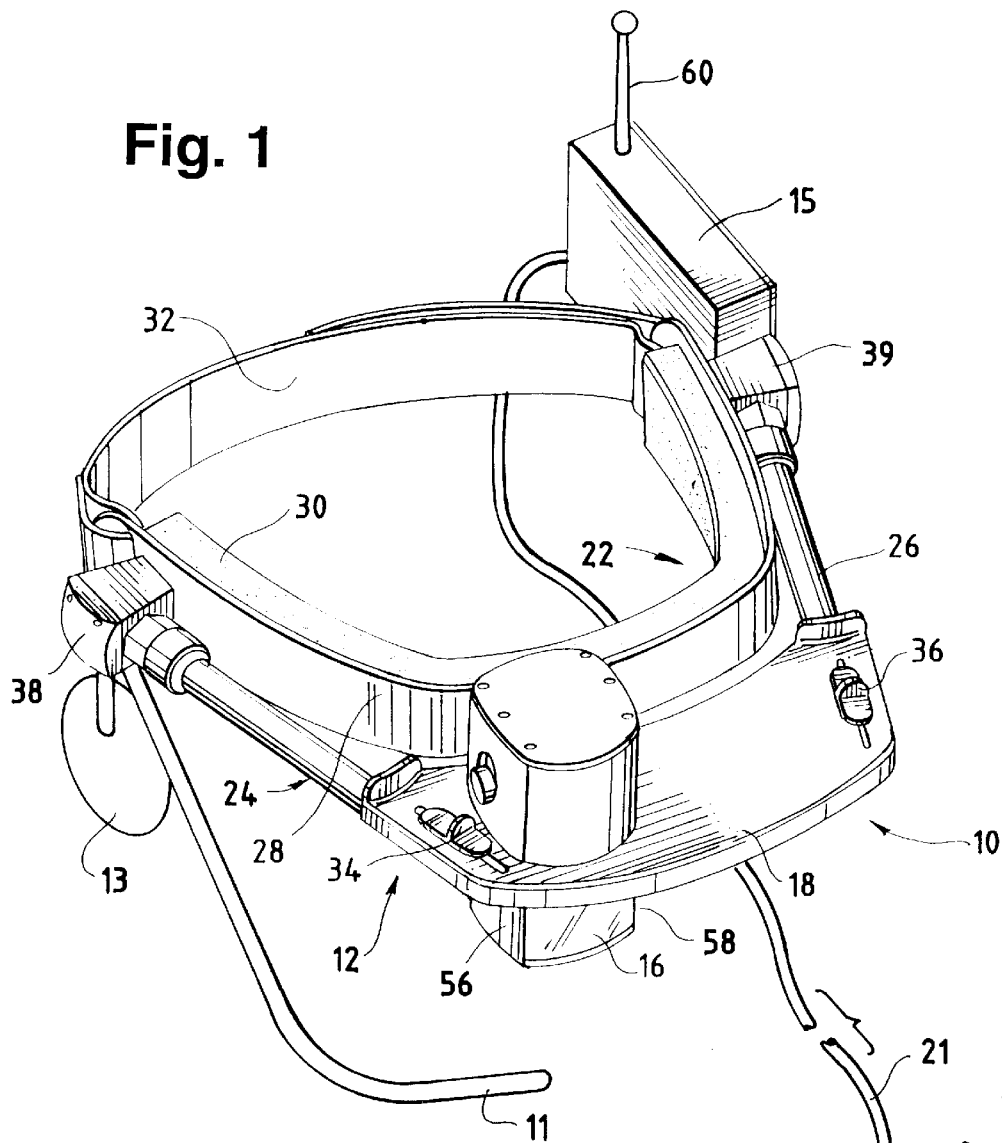
FIG. 1 is a perspective view of a head mounted system with a microphone to pick up spoken utterances for recognition by the present invention.

The speech recognition manager of the present invention allows a head mounted display system 10 as shown in FIG. 1 to operate completely, or almost completely hands free by responding to utterances spoken by a user as picked up by a microphone 11. The microphone 11 is mounted on a frame 12 of the head mounted display system 10. The frame 12 also supports a display 14 and associated optics 16 for providing video feedback to a user in response to the user's verbal input, i.e. spoken utterances. One or more speakers or earphones 13 is mounted on the frame 12 to provide audio feedback to the user in response to the user's verbal input as well.

The electronics for the systems 10 may be completely head mounted and contained in a housing 15 or the like supported on the frame 12. Alternatively, only a portion of the electronics may be supported on the frame 12 with the other portion thereof being contained in a portable housing such as a hand-held or body-worn computer or controller unit 17. The unit 17 includes a hook 19 for attachment to a user's belt so that the unit 17 can be worn, leaving the user's hands free. The unit 17, preferably, includes a CD ROM drive for reading a CD ROM (read only memory) containing software to be processed by the electronics of the system 10 and/or data to be selectively presented to the user via the display 14 or the speaker 13. The unit 17 may also include batteries to provide power to the head mounted display system 10. The circuitry within the unit 17 is connected to the circuitry contained in the housing 15 mounted on the frame 12 of the head mounted display system 10 via a cable 21. Alternatively, the head mounted system 10 can communicate with the non-remote unit 17 using infra-red wireless communication technology or radio wireless communication technology.

Figure 2:
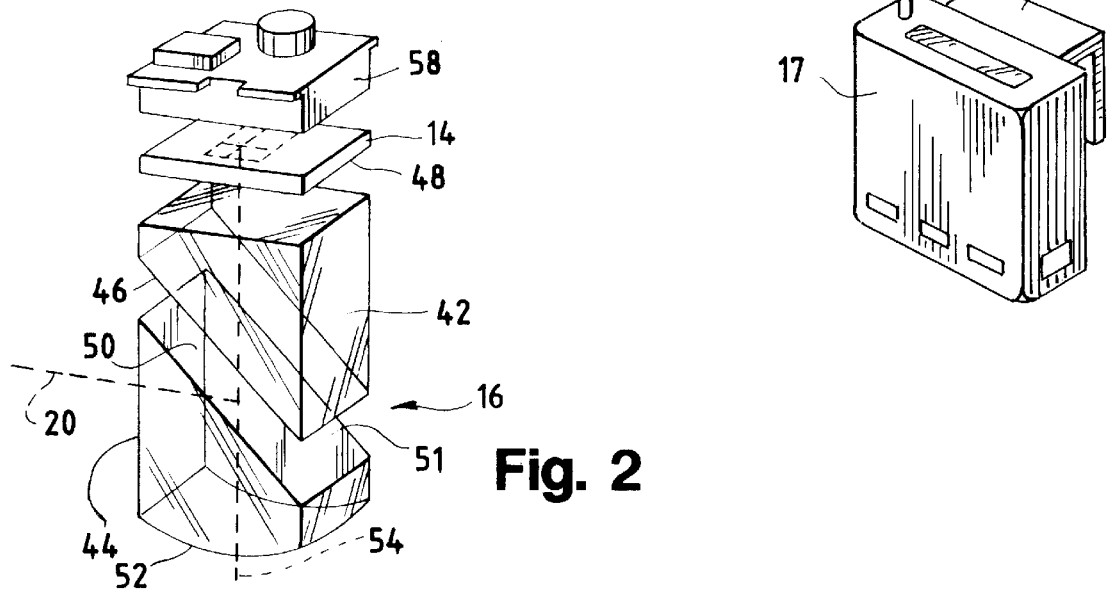
FIG. 2 is an exploded view of the display and optics of the head mounted system of FIG. 1.
Figure 3:
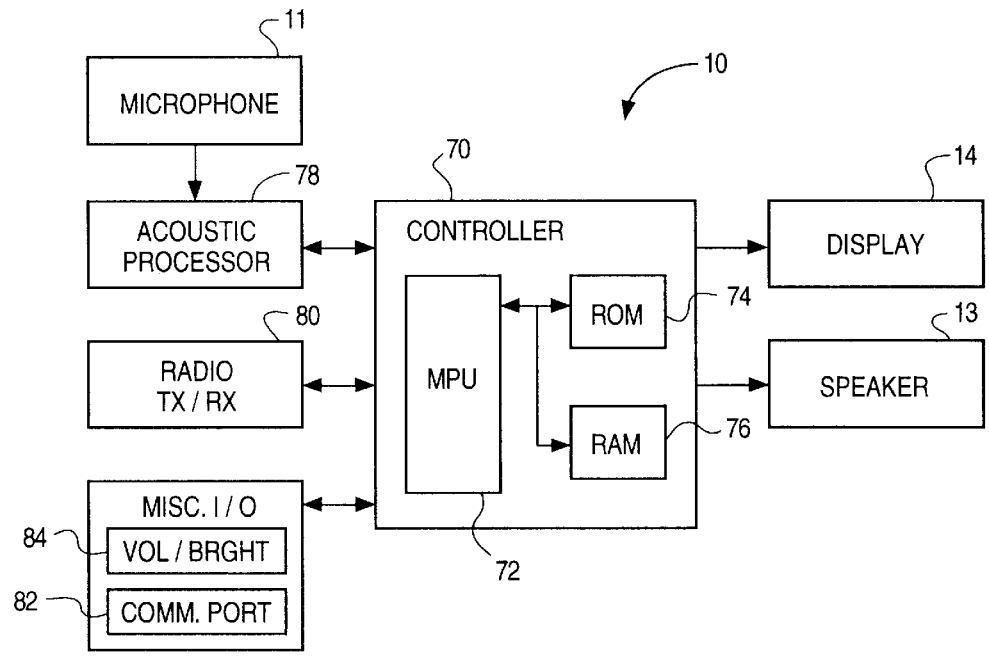
FIG. 3 is a block diagram of the electronics of the system illustrated in FIG. 1.

As shown in FIGS. 1 and 2, the frame 12 supports a liquid crystal display 14 and associated monocular optics 16 to provide visual feedback to the user in response to the user's speech so as to provide a processing system that can be operated in a hands free manner. The optics 16 may take the form of a solid block monocular optical element as shown although it is apparent that other optical systems including binocular optical systems can be employed as well. The optical element 16 projects an enlarged image 25 of the information depicted on the display 14 so that the image appears to be located at a distance from the user that may be infinity or less than infinity depending on the purpose for which the system 10 is worn. Further, the optical element 16 is preferably semi-transparent so that the projected image 25 appears to be superimposed on the real world, a portion of which is viewed by the user through the optical element 16.

The optical element 16 as shown in detail in the exploded perspective view of FIG. 2 has a solid body formed of a first prism 42 and a second prism 44. A lower surface 46 of the upper prism 42 is cut at a 45° angle with respect to a face 48 of the display 14. An upper surface 50 of the lower prism portion 44 of the optical element 16 has a 45° angle cut that is complimentary to the 45° cut of the upper prism portion 42 to allow the surfaces 46 and 50 to abut each other to form an optical element 16 having a solid body. A partially reflective coating 51 is formed on either the upper surface 50 of the lower prism 44 as shown in FIG. 2 or on the lower surface 46 of the upper prism portion 42 so as to form an internal partial reflector when the upper prism 42 is attached to the lower prism 44. The lower prism portion 44 has a focusing surface 52 that has a spherical shape to magnify the information depicted on the display 14. The focusing surface 52 has a central axis 54 that extends through a vertex of the surface 52 wherein the central axis 54 is coaxial with a central axis of the display 14, the central axis of the display 14 being perpendicular to the face 48 of the display 14. The central axis 54 of the focusing surface 52 is also perpendicular to the direct line of sight or see-through axis 20 of the optical element 16. The focusing surface 52 of the lower prism 44 is made fully reflective so as to reflect an image of the information depicted on the face 48 of the display 14 to the partially reflective surface 51. The partial reflector 51 in turn reflects the image to an eye of the user. The user perceives an enlarged image of the displayed information as projected by the focusing surface 52 at a distance from the user that is greater than the optical path from the display 14 to the user's eye through the optical element 16. Because the internal coating 51 is partially reflective, the image perceived by the user appears to be superimposed upon the real world. Further, since the central axis 54 of the focusing surface 52 having magnification power is perpendicular to the visual axis 20 along which the user looks to perceive the image, the portion of the real world viewed by the user through the optical element is not distorted. This is extremely important when the head mounted display system is worn by a user who has to function in the real world.

It is noted that when the liquid crystal display 14 and/or backlight contained in the display housing 58 is turned off, the view of the real world perceived by one eye of the user through the optic 16 is without distortion or impairment. The display 14 and/or associated backlight can be turned off in response to a simple verbal command such as "suspend" picked up by the microphone 11 and decoded by the speech recognition manager of the present invention. This feature is provided so that the user can quickly turn off the display when desired and easily function in the real world with the system 10 without visual impairment. Whenever visual information is needed, the user speaks one or more words such as "resume" so as to cause the system 10 to control the display to provide the desired information so that it is superimposed on the user's view of the real world.

In a preferred embodiment, the sides 56 and 58 of the optical element 16 as well as the bottom of the focusing surface 52 are covered with a black material or black coating that is extremely thin. The coating protects the optical element and the black color is such that the sides 56 and 58 seem to disappear so that they are not perceived by the user. The reflective coating 51 is preferably within the range of 25%–75% reflective whereas the focusing surface 52 of the optical element is made 100% reflective. The prisms 42 and 44 may be formed of a transparent material having an index of refraction of 1.00–1.78. One preferred material is polymethyl-methacrylate (PMMA) having an index of approximately 1.49.

The frame 12 of the head mounted system 10 as shown in FIG. 1 includes a central support 18 on which the display 14 and optical element 16 are mounted so that the optical element 16 is in the direct line of sight of one of the user's eyes. Also mounted on the frame 12 is an antenna 60 that forms part of a wireless communication system as discussed below. The wireless communication system allows the head mounted system 10 and/or unit 17 to communicate with a remote processing system so as to provide two-way wireless communication of digital data. Thus, while the user of the system 10 is carrying out a function or operation at one site, the user may readily be in communication with a host or more powerful processing system at a remote site. The user can receive information from the remote site while his hands are free to carry out a particular operation, such as on a machine or the like. It is noted that the wireless communications can be used to communicate with a non-remote processing system as well as should be apparent.

The central support 18 of the frame 12 is coupled to a headband 22 by a pair of arms 24 and 26. The headband 22 includes a contoured front portion 28 made of a material such as plastic that has the structural integrity to support the arms 24, 26, the central support 18, the display 14 and optical element 16. A foam pad 30 or the like is disposed on an inner surface of the front portion 28 of the headband 22 so as to provide a cushion between the user's head and the front portion 28 of the headband 22. The headband 22 also includes an adjustable strap 32 that may be made of fabric, plastic or the like so as to secure the frame 12 about a user's head. The central support 18 and thus the optical element 16 may be moved towards the user's face or away therefrom by an adjustable coupling 34, 36 that engages an outer portion of the respective arms 24, 26 and extends through respective slots in the support 18 so as to adjustably mount the support 18 on the frame 12. The arms 24 and 26 may also be pivotally attached to the headband 22 by adjustable clamping members 38 and 39 so that the central support 18 can be raised and lowered.

The speech recognition manager of the present invention is useable with any processing system requiring input commands and should not be limited to a head mounted system. However, when used with a head mounted system of the type described herein, great synergy is obtained because the user can interact with a remote or non-remote processing system using sight and sound i.e. visual and audio communications which is the typical manner of communications between two people. Further, this interaction with the processing system occurs without impairing the user's ability to operate in the real world. In particular the user's sight of the real world is not impaired and his hands are free to perform functions in the real world other than typing input commands for the processing system which is controlled by the user's speech inputs.

The speech recognition manager of the present invention is implemented by a controller 70 that forms a portion of the electronics of the head mounted system 10 described above. The controller 70 includes a microprocessor 72 that operates in accordance with software and fixed data stored in a read only memory (ROM) 74. A random access memory (RAM) 76 provides scratch pad memory and is used to store data that may be changed. Other memory configurations that utilize EEPROMs or the like may also be utilized as should be apparent. The controller 70 receives inputs from the microphone 11 via an acoustic processor circuit 78. The acoustic processor circuit 78 converts a spoken utterance, i.e. speech in the form of a word, phrase or sentence, picked up by the microphone 11 to a digital electrical signal. Depending upon the speech decoding system employed as discussed below, the acoustic processor circuit 78 may include its own controller, microprocessor or the like for converting the digital signals into word representations that are coupled to the controller 70. Alternatively, the acoustic processor circuit 78 may couple the digital electrical signals representing the spoken utterance directly to the controller 70 which itself operates in accordance with speech decoding software so as to generate the word representations utilized by the speech recognition manager of the present invention.

The controller 70 is in communication with a processing system at a remote or non-remote site via a radio wireless communication system 80 or the like. The wireless communication system 80 includes a transmitter and receiver for providing two-way wireless communications of digital data and/or audio information between the controller 70 and the remote site. The controller 70 can also communicate with a processing system via a communication port 82 that provides a hard wired connection between the controller 70 and the second processing system. Key switches 84 may be provided on the unit 17 or the unit 15 so as to provide finger actuated inputs to the controller 70 to control for example, the volume of the speaker 13, brightness of the display 14, etc. so that although the system 10 can be operated completely hands free, it can also receive key actuated inputs. The controller 70 is responsive to these various inputs so as to control the information depicted on the display 14 as well as to provide audio information to the user via the speaker 13.

Figure 4:
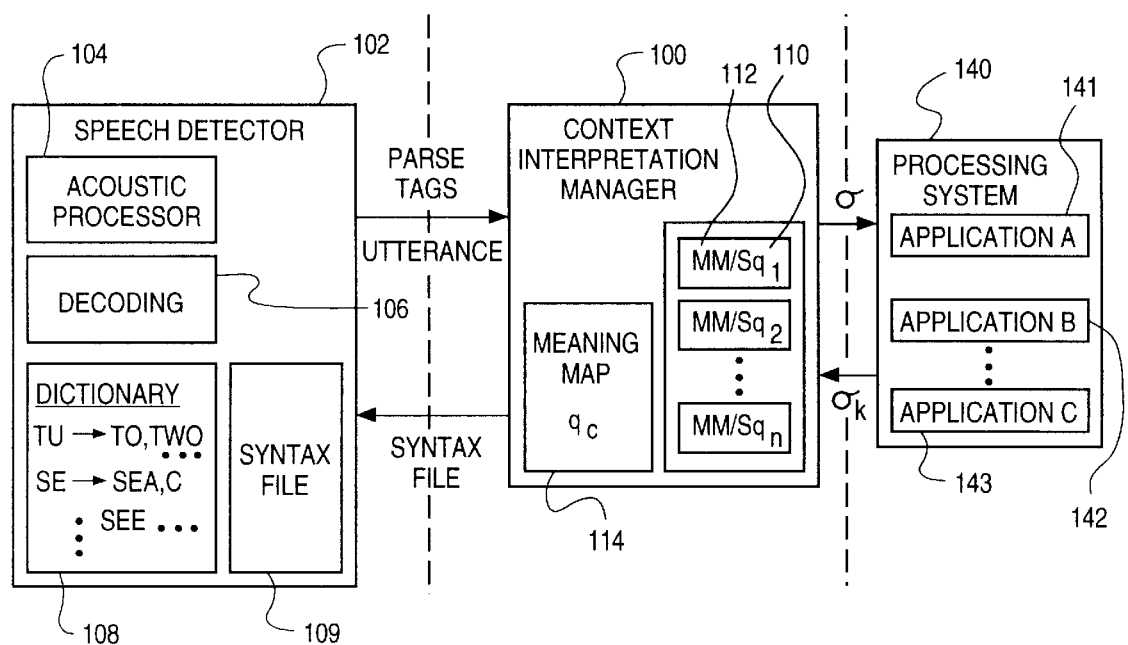
FIG. 4 is a block diagram of the speech recognition manager's software and data files and the interaction thereof with the software of a speech decoding system and processing system.

The speech recognition manager for the system 10 is implemented by the microprocessor 72 operating in accordance with the manager's software and data stored in the memories 74 and 76, wherein the manager's software is depicted in FIG. 4 as context interpretation manager software 100. The context interpretation manager software 100 receives representations of one or more words from speech detector software 102 implemented by the acoustic processor circuit 78 alone or in conjunction with the microprocessor 72. The context interpretation manager software 100 determines the current context state of communications with the user to assign different meanings to the same spoken word used in different context states i.e. different contexts.

The context interpretation manager is based on a recognition that people use the same word or words in different circumstances to have completely different meanings and to illicite different responses from a listener. Heretofore, the speech detector software that is available has not been able to deal with this phenomena of normal human to human communication. Thus, the prior speech decoding systems have not been able to accurately decode and recognize or interpret speech. Because the speech recognition manager of the present invention does account for changes in the context of communications with the user, the speech recognition manager can very accurately recognize spoken utterances so as to assign the correct meaning to those utterances. Further, although the speech recognition manager of the present invention utilizes inputs from a known speech decoding system as discussed below, the speech recognition manager limits the grammar or syntax as well as the vocabulary of words recognized by the speech decoding system in a given context. Thus, the combination of a known speech decoding system and the speech recognition manager of the present invention is much more flexible, adaptable, scalable and formal than the speech decoding system alone as operated in accordance with known methods prior to the present invention.

FIG. 4 illustrates a block diagram of the software utilized in processing a spoken utterance picked up by the microphone 11 in order to generate an input command a for internal use or for use by a processing system 140. Speech detector software 102 may be implemented by the acoustic processor circuit 78 alone or in conjunction with the microprocessor 72 depending upon the speech decoding system employed. The software 102 as well as the acoustic processor 78 for implementing all or a portion of the software may be any available speech decoding system. Preferably, the speech decoding system employed utilizes a syntax file or the like that can be updated wherein the syntax file defines an allowable grammatical structure and limits the words that can be recognized in different parts of the grammatical structure. One known system that is suitable is the PE 500 system available from Speech Systems, Inc. This system includes an acoustic processor circuit 78 and speech detector software 102. The speech detector software includes acoustic processing software 104 for converting digital signals representing spoken utterances picked up by the microphone 11 into a sequence of phoneme codes. Decoding software 106 decodes the sequence of phoneme codes utilizing a dictionary file 108 and a syntax file 109. The dictionary file 108 maps phoneme code sequences to words. The syntax file 109 defines the search of the decoding software 106 so that what is searched for are words and sentences reasonably expected based upon a set of grammatical production rules.

More specifically, the syntax file 109 defines a production rule sequence which represents allowable patterns of words looked for in the literal string of a phoneme sequence representing a spoken utterance. The production rules utilize parse tags which are intermediate labels used in the decoding process wherein one or more production rules correlate spoken utterances to parse tags and/or literal word strings. Examples of syntax files are described below. When implemented, the decoding software 106 generates data representing a literal string of words, this literal string representing the decoded utterance picked up by the microphone 11. In addition to the literal string representing an utterance, the decoding software 106 generates among other information the parse tags associated with the utterance. These representations of one or more words, i.e literal text strings representing utterances and parse tags, are utilized by the context interpretation manager software 100 in order to accurately assign a meaning or input command σ to the utterance.

The context interpretation manager software 100 is implemented by the microprocessor 72 which utilizes data stored in the memories 74 and 76 for a number of different context states. When implemented, the context interpretation manager software 100 determines a current context state and is responsive to the data stored in the memories 74, 76 for assigning to a received word representation, one meaning represented by one input command $\sigma_1$ when the current context state is determined to be one context state and for assigning a different meaning represented by a different input command $\sigma_2$ to the same word representation when the current context state is determined to be a different from the one context state.

The data stored in the memories 74 and 76 for use by the context interpretation manager includes for each of a number of context states, one or more data table correlating word representations to input commands σ. In one embodiment of the present invention wherein the speech decoding system is of the type illustrated in FIG. 4, utilizing a syntax file, the data stored for each context state includes a syntax table or file containing a set of grammatical production rules including information correlating word representations in the form of utterances to word representations in the form of parse tags for that particular context state. Also stored for each context state is a second file or data table referred to as a meaning map that correlates word representations in the form of a sequence of one or more parse tags and/or literal text strings representing an utterance to an input command a. The memory 74, 76 also stores, for each context state, data correlating at least one word representation in the form of a parse tag sequence or utterance to a context state transition input command. Each context state may have one or more context state transition input commands associated therewith so as to cause a change from that context state to a different context state as discussed below.

The context interpretation manager software 100 is responsive to the assignment of a context state transition input command to a received word representation as indicated in the meaning map 114 for the current state $q_c$ to determine a new context state $q_k$ according to which the context interpretation manager is to operate. Whenever a new context state is determined, the context interpretation manager software 100 causes the meaning map for the new context state $q_k$ to be loaded into an area of the RAM 76 associated with the meaning map 114 for the current context state. At this time the context interpretation manager software 100 also causes the syntax file 110 associated with the new context state $q_k$ to be loaded to the speech decoding system so that it forms the syntax file 109 utilized by the speech detector software 102. Because a new syntax file is loaded into the speech decoding system each time that the speech recognition manager determines that the context state has been changed, the syntax file utilized by the speech detector software 102 can be much smaller than the syntax files previously utilized without the speech recognition manager of the present invention.

Figure 7:
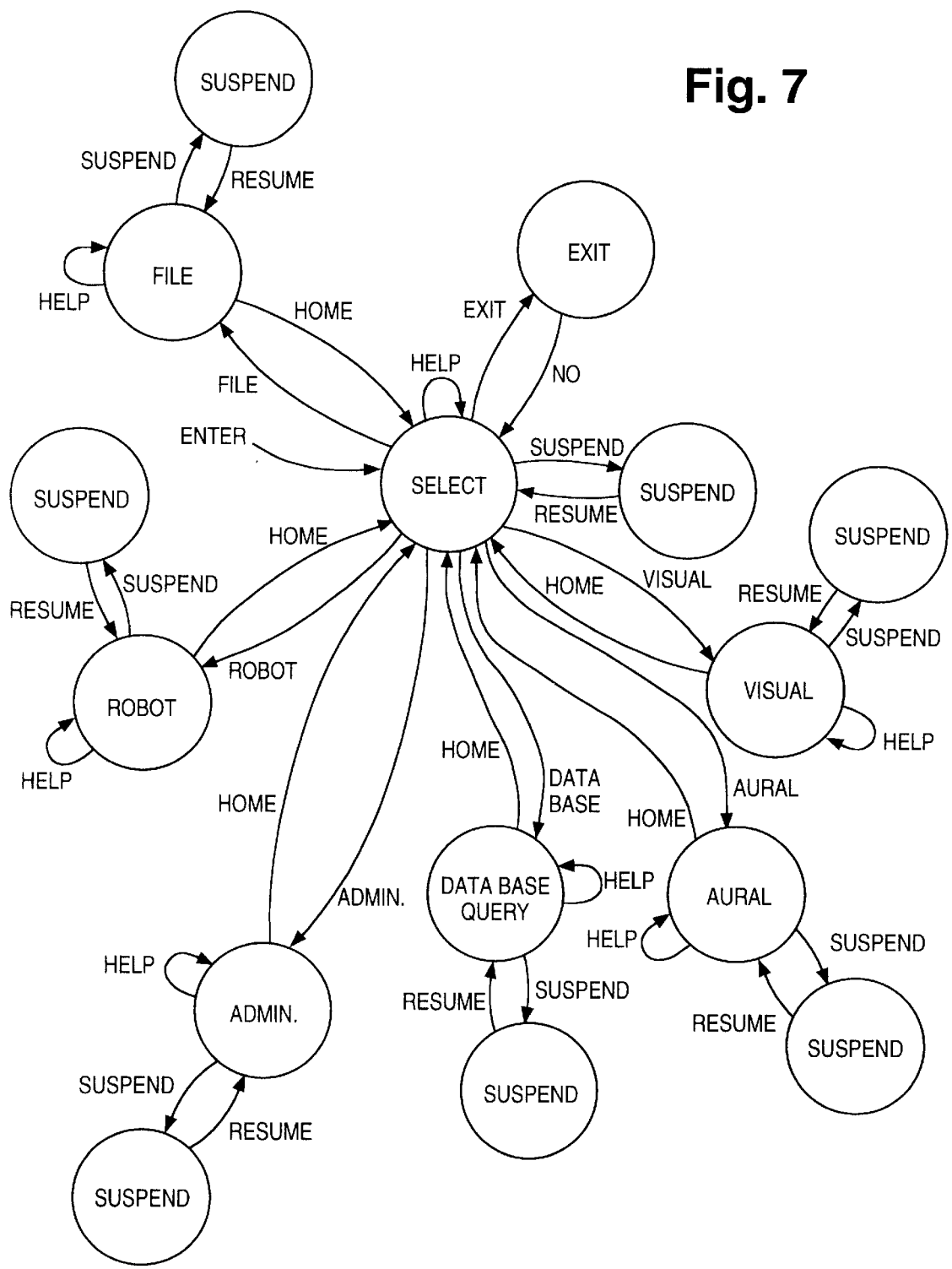
FIG. 7 is a state diagram illustrating the operation of the microprocessor of FIG. 3 when operating in accordance with the speech recognition manager software of FIGS. 4 and 10A–B in a number of different context states.

FIG. 7 is a state diagram illustrating a number of different context states and the input commands for transitioning from one context state to another context state. The states illustrated in FIG. 7 are depicted for illustration purposes only, the speech recognition manager of the present invention being capable of handling many more context states of various types as will be apparent. For example, upon powering up the system 10, the microprocessor 72 may wake up in a SELECT state. In this SELECT state, the user can choose to enter one of a number of different modes each of which is represented as a different state, for example the FILE state, ROBOT state, ADMINISTRATION state, DATABASE QUERY state, AURAL state and a VISUAL state. The user selects one of these modes or states by speaking an utterance that will generate the context state transition input command to the desired state. For example, if the user says the word "visual" then the context interpretation manager loads the syntax file for the VISUAL state to the speech detector 102 so that it becomes the syntax file 109 for decoding utterances picked up by the microphone 11 in the VISUAL state. The meaning map for the VISUAL state is also loaded into the area of the RAM 76 for the meaning map 114 of the current state $q_c$.

As can be seen from FIG. 7, each state is able to respond to certain input commands that are used internally by the speech recognition manager. Among these internally used input commands are context state transition input commands such as "file," "robot," "administration," "database," "aural," "visual," and "home" wherein the "home" command causes a transition from the current state to the SELECT state and the other commands if received in the SELECT state cause a transition from that state to the state identified in the command. Other internally used input commands include a "help" command to which the manager responds by providing help information to the user via the display 14 and/or speaker 13. A "suspend" command causes the manager to blank or turn off the display and/or backlight so that the user can view the real world through the optic 16 without impairment. A "resume" command causes the manager to display an image on the display 14 so as to superimpose displayed information on the real world.

FIG. 5 represents an example of a syntax file 110 for the VISUAL state; whereas FIG. 6 illustrates a meaning map 112 for the VISUAL state as well as the action carried out as a result of the input command a generated in accordance with the meaning map 112. It is noted that although the meaning map shown in FIG. 6 correlates only parse tags to an input command, the meaning map may also correlate literal text strings to input commands. As an example, the VISUAL mode may be used to allow a user of the system 10 to view a geographical map depicted on the display 14. By speaking various utterances into the microphone 11 the user in the VISUAL mode can cause the displayed image to be zoomed in or out of magnification; to be hidden and retrieved after the image has been hidden; and to be panned so that the user sees more of the northern portion of the map, the southern portion, eastern portion or western portion; etc.

As seen in FIG. 5, the syntax file for this VISUAL mode or state includes a list of production rule sequences or word patterns 120–131. The production rule 120 represents the primary rule for grammar used in the VISUAL state so that all allowable sentences are in the form of a +ZOOM, +HIDE, +PAN, +GET OR +HOME command. These commands are parse tags that are correlated with word representations in the form an utterances by subsequent production rules. For example, the production rules 121 and 122 define the means by which the +ZOOM parse tag is ultimately correlated with the utterance "zoom in more."

In operation, if the system is operating in the VISUAL state, wherein the syntax file for the VISUAL state as depicted in FIG. 5 is utilized at 109 by the speech detector software 102 implemented by the speech decoding system, the speech decoding system responds to the utterance "zoom in" as follows. First, the system generates a phoneme code sequence. The system then looks to the syntax file 109 loaded therein, i.e. the VISUAL syntax file and determines that the structure of the phoneme code sequence matches the production rule sequences 120, 121, and 122 which produce a sentence which matches the spoken utterance with the highest degree of match. Thereafter, the system operating in accordance with the speech detector software 102 checks the utterances associated with the parse tags that most closely match the determined phonemes for the received utterance. In this case, the system will determine that the first phoneme most closely matches the utterance "zoom" for the parse tag sequences 120 and 121. Thereafter, the system will determine that the phoneme for "in" most closely matches the utterance "in" associated with the "+IN" parse tag. Therefore, the speech decoding system in accordance with the speech decoder software 102 will output the parse tags "+ZOOM" and "+IN" to the context interpretation manager software 100. The speech detector software 102 also outputs the literal string representing the spoken utterance to the context manager 100 as well. For example, if the user speaks the phrase "please zoom in more" the literal string representing the utterance input to the context interpretation manager software 100 represents the literal words "please zoom in more" if decoded properly; whereas the parse tag sequence provided will include the "+ZOOM" and "+IN" parse tags.

Upon receipt of a parse tag sequence and literal string representation of an utterance, the context interpretation manager 100, when in the VISUAL state with the visual meaning map as depicted in FIG. 6 stored in the area of the RAM 76 for the meaning map 114 of the current context state, operates as follows. The context interpretation manager 100 is responsive to the parse tag sequence representing "+ZOOM" and "+IN" to look to the meaning map to find the input command σ that is correlated with this parse tag sequence. In this example, the input command a correlated with the parse tag sequence represented by "+ZOOM" and "+IN" is the "zoom increase" input command. This input command generated by the context interpretation manager is then provided to processing system software 140 as shown in FIG. 4. The processing system software includes one or more application programs 141–143 that are responsive to one or more input commands to carry out an action. In this example, the processing system 140 may represent software implemented by the microprocessor 72 for controlling the display 14. In the example where the user speaks the utterance "please zoom in more" so that the context interpretation manager software 100 generates the input command "zoom increase" the microprocessor 72 when operating in accordance with a software routine such as application A at 141 will respond to the input command "zoom increase" to control the liquid crystal display 14 to scale the displayed image down by a factor of two.

As can be seen from the above example, the processing system 140 represents software that may be implemented by the same microprocessor 72 which implements the context interpretation manager software 100. Alternatively, the processing system software 140 may be implemented by another microprocessor or the like that is in communication with the microprocessor 72, for example, a second microprocessor included in the body worn unit 17. Further, the processing system software 140 may be implemented by a remote or non-remote processor that is in communication with the microprocessor 72 via the wireless communication network 80 or the wired communication port 82.

It is noted that the processing system software 140 when implemented by the microprocessor 72 or another processor may generate input commands that are fed back to the context interpretation manager 100 so as to cause a change in the current state of communications with the user. This is illustrated in FIG. 4 by the processing system 140 providing a new input command representation $\sigma_k$ to the context interpretation manager software 100. Because of this, whenever there is a state change it is preferred that the context interpretation manager advise the user of a context state change via the display 14 and/or speaker 13.

Figure 10A:
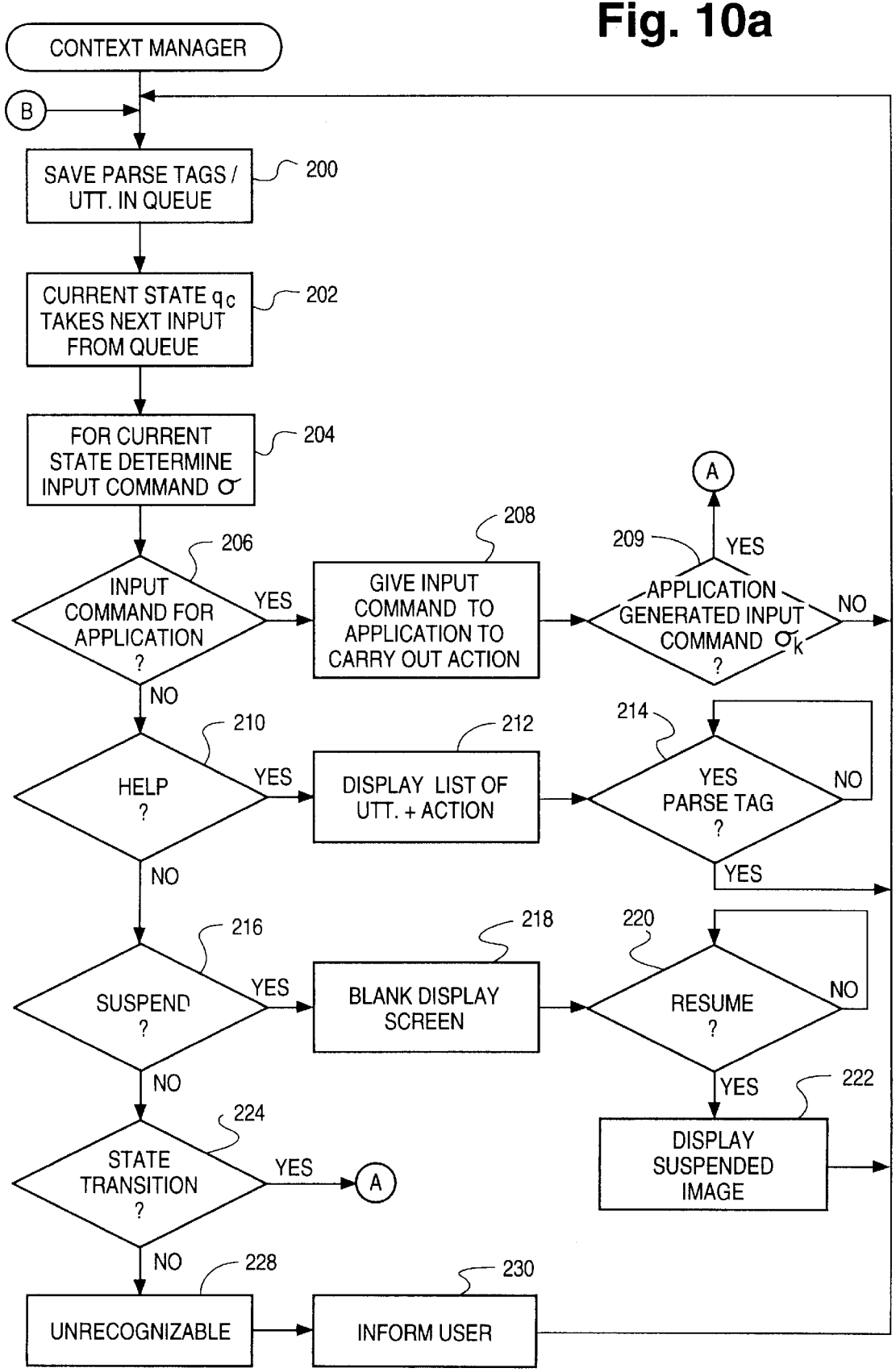
FIGS. 10A–B form a flow chart illustrating the operation of the microprocessor of FIG. 3 when implementing the speech recognition manager software of the present invention.
Figure 10B:
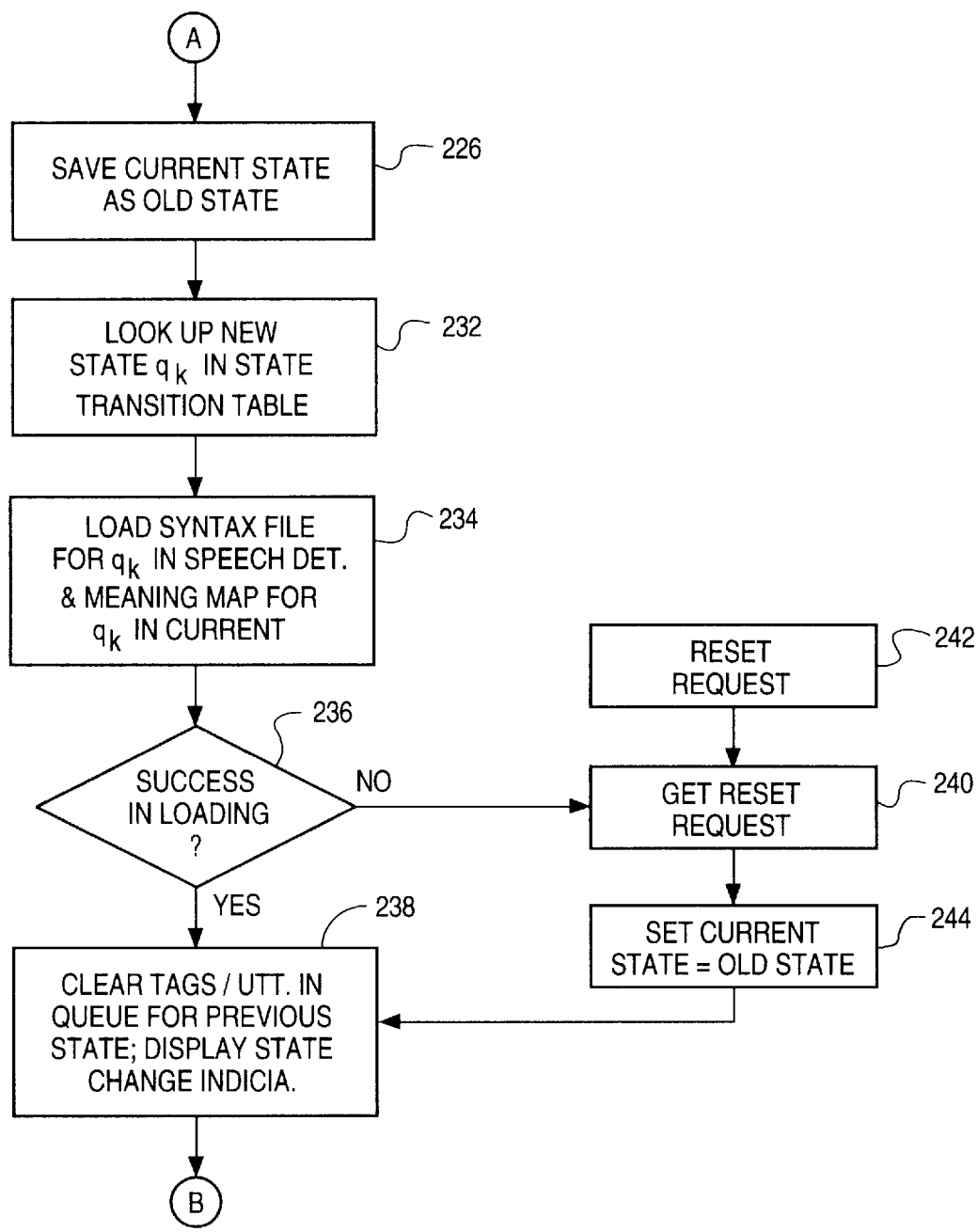

The operation of the context interpretation manager software 100 as depicted in FIGS. 1A–B is as follows. At a block 200, the microprocessor 72 saves the parse tags and/or utterances received while in a given state in a queue for processing. Thereafter, at a block 202 the microprocessor 72 obtains the next parse tag or utterance from the queue for the current state $q_c$. The microprocessor 72 then determines at a block 204 the input command $\sigma$ to which the parse tag or utterance correlates to utilizing the meaning map 114 for the current context state. At a block 206, the microprocessor 72 determines whether the input command identified at block 204 is an input command for another state of operation within the application i.e. an input command for the processing system software 140. If it is, the microprocessor 72 at block 208 gives the input command identified at block 204 to the application of the processing system software 140 so that the action associated with the input command can be carried out. Thus, in the above example when the input command was determined to be "zoom increase" the microprocessor 72 provides this input command to the application software that is controlling the display 14. This application program is responsive to the input command "zoom increase" to carry out the action to scale the displayed image down by a factor of two as seen from FIG. 6. From block 208 the microprocessor proceeds to block 209 to determine whether the application generated an input command $\sigma_k$. If so, the microprocessor 72 determines that a state transition is needed and proceeds to block 226 of FIG. 10B. If the input command is not generated for an application, the microprocessor 72 proceeds from block 206 to a block 210.

At block 210, the microprocessor 72 determines whether the input command identified at block 204 represents the help input command. If so, the microprocessor 72 proceeds to block 212 to display on the display 14 a list of possible utterances i.e. verbal commands that the user can speak in the current context state and the action that will result if the user does speak an associated utterance. At block 212, the microprocessor can also provide verbal help to the user via the speaker 13. Also depicted with the help list on the display 14 is a question asking the user whether he is finished reviewing the displayed help information and prompting the user to answer yes or no. If the context interpretation manager receives a yes utterance or parse tag as determined at block 214 in response to this displayed question, the context manager proceeds from block 214 to block 200 to continue processing the parse tags and/or utterances in the queue for the current state $q_c$. Otherwise, the microprocessor 72 waits at block 214 until the yes utterance and/or parse tag is processed in response to the displayed question. If the microprocessor 72 determines at block 210 that the input command identified at block 204 is not the help command, the microprocessor 72 proceeds to block 216 to determine whether the input command is the suspend input command.

If the microprocessor 72 determines that the input command is the suspend input command, the microprocessor 72 at block 218 controls the display 14 to go blank and/or turns off the display and/or backlight therefore. This input command thus causes the microprocessor 72 to control the display 14 to be off or to appear to be off so that the user of the head mounted system 10 can view the real world through the optic 16 without any additional information from the display 14 being projected by the optic 16 on the real world. Thus, if the user wants to extinguish the image depicted on the display 14 while operating in any state depicted in FIG. 7, the user merely speaks an utterance correlated with the suspend input command (the utterance may simply be the word "suspend") so that the display 14 is immediately blanked. After blanking the display screen in response to the suspend input command, the microprocessor 72 waits at block 220 for the receipt of the resume input command so as to control the display 14 at block 222 to display an image. From block 222, the processor proceeds back to block 200 to continue to process input commands in the current state. If the input command is not the suspend input command as determined by the microprocessor 72 at block 216, the microprocessor 72 proceeds to block 224 to determine whether the input command is a context state transition input command and if so, the microprocessor proceeds to block 226 shown in FIG. 10B. If the microprocessor 72 determines that the input command is not a context state transition input command at block 224, the microprocessor 72 proceeds to block 228. At block 228, the microprocessor determines that the parse tag and/or utterance is unrecognizable and the microprocessor 72 proceeds to block 230 to inform the user of this event. At block 230, the microprocessor 72 may inform the user that the input was unrecognizable by displaying a message to that affect on the display 14 or by providing an audio message to the user via the speaker or earphone 13.

When the input command identified at block 204 is determined to be a context state transition input command, the microprocessor 72 proceeds from block 224 to block 226 at which time the microprocessor 72 saves the current state as the old state. Thereafter, at block 232, the microprocessor 72 looks up the new state $q_k$ in a state transition table. The state transition table may be a single table correlating each of the context state transition input commands for current and new states or it may be formed from entries in various ones of the meaning maps for each state. An example of the latter approach is depicted in FIG. 6 at 233 wherein the "home" utterance or parse tag sequence is correlated to the input command "transition to SELECT state" which identifies the new state as the SELECT state. After finding the new state $q_k$ in response to the context state transition input command, the microprocessor 72 proceeds to block 234. At block 234, the microprocessor 72 loads the syntax file for the new state $q_k$ in the speech decoding system at 109 for use by the speech detection software 102. At block 234, the microprocessor 72 also loads the meaning map for the new state $q_k$ in the area of the RAM 76 for the meaning map 114 of the current state. Thereafter, the microprocessor 72 proceeds to block 236 to determine whether the loading of the syntax file and memory map has been successful. The loading will not be successful, if for example, there is not sufficient space in the memory areas for the syntax file 109 or current meaning map 114 for the entire syntax file and/or meaning map of the new context state. If the loading is successful, the microprocessor 72 proceeds to block 238 to clear the parse tags and/or utterances stored in the queue for the previous state. The microprocessor 72 also controls the display 14 at block 238 to display a message or other indicia to the user indicating a change in the context state. A verbal message to this affect may be given to the user additionally or alternatively. From block 238, the microprocessor 72 proceeds back to block 200 to continue to process the parse tags and/or utterances received from the speech decoding system operating in accordance with the software 102. If the loading of the syntax file and meaning map at block 234 was not successful as determined at block 236, the microprocessor 72 proceeds from block 236 to block 240. At block 240, the microprocessor 72 obtains a reset request from block 242 and thereafter sets the current state back to the old state at block 244. From block 244, the microprocessor 72 proceeds to block 238 so that the parse tags and/or utterances are processed in accordance with the old state.

FIG. 11 illustrates an example of the syntax file for the SELECT state. As shown therein, the parse tag "+FILE" correlates with a context state transition input command for the transition from the SELECT state to the FILE state. The parse tag "+ROBOT" correlates with the context state transition input command for the transition from the SELECT state to the ROBOT state. The parse tag "+ADMINISTRATION" correlates with the context state transition input command to transition from the SELECT state to the ADMINISTRATION state. The "+DATABASE" parse tag sequence correlates to the input command to transition from the SELECT state to the DATA BASE QUERY state. The "+AURAL" parse tag correlates to the context state transition input command to transition from the SELECT state to the AURAL state; whereas the "+VISUAL" parse tag correlates to a context state transition input command to transition from the SELECT state to the VISUAL state. The parse tag sequence "+HELP" correlates to the help input command. The "+SUSPEND" parse tag sequence correlates to the suspend input command; whereas the "+RESUME" parse tag sequence correlates to the resume input command. A parse tag sequence "+EXIT" correlates to an exit input command to which the microprocessor 72 responds to exit a mode of the application. It is noted that the syntax files and meaning maps in FIGS. 5, 6, 8, 9 and 11 are not meant to be a complete listing but are merely examples for illustrative purposes.

FIGS. 8 and 9 when compared to FIGS. 5 and 6 illustrate the feature of the present invention wherein the speech recognition manager, i.e. the microprocessor 72 operating in accordance with the context interpretation software 100 assigns to the same spoken utterance, different meanings represented by different input commands when the system is in different states. For example, when the system 10 is in the VISUAL state and the user speaks the word "get", the word representation in the form of the utterance "get" as well as the word representation in the form of the parse tag "+GET" are provided by the speech decoding system operating in accordance with the speech detector 102 to the context interpretation manager software 100 based on the VISUAL syntax file and the parse tag sequence 130. The context interpretation manager 100 in the VISUAL state responds to the receipt of the "get" utterance and/or "+GET" parse tag sequence by identifying at block 204 the "show" input command as obtained from the meaning map for the VISUAL state depicted in FIG. 6. The "show" input command is given by the microprocessor 72 at block 208 to the appropriate application which carries out the corresponding action depicted in FIG. 6 so as to display on the display 14 an image that is currently being hidden as discussed above. When the user speaks the word "get" while the system is in the ROBOT state such that the robot syntax file depicted in FIG. 8 is being utilized by the speech detector software 102 at block 109 and the meaning map for the ROBOT state depicted in FIG. 9 is utilized by the context interpretation manager as the meaning map 114 for the current context state, then the meaning of the word "get" is different than the meaning of the word in the VISUAL state as follows. The context interpretation manager software 100 receives the "get" utterance as well as the "+GET" parse tag from the speech decoding system that is using the robot syntax file at 109. The context interpretation manager software is responsive to the "get" utterance and/or "+GET" parse tag sequence to identify the "retrieve" input command from the meaning map for the ROBOT state. The "retrieve" input command when output by the microprocessor 72 to a processing system 140 operating in accordance with an application that is responsive thereto will carry out the action depicted in FIG. 9. Specifically, the processing system software will control a robot having a mechanical arm with grippers or fingers on the end thereof so that the arm drops down and the grippers or fingers close about an object to be picked up. Thereafter, as part of the action carried out by the "retrieve" input command, the mechanical arm is raised. As can be seen, a different input command i.e. "retrieve" is assigned to the utterance "get" in the ROBOT state as compared to the input command "SHOW" assigned to the utterance "get" in the VISUAL state. Further, the action resulting from these different input commands assigned to the same utterance in different states is drastically different although it does not need to be.

The embodiment of the speech recognition manager described above operates with a speech decoding system that utilizes a syntax file. However, the speech recognition manager of the present invention may be utilized by a speech decoding system that does not utilize a syntax file as well. In this event, the speech recognition manager may include software that can accommodate a syntax file therein. Alternatively, a syntax file need not be used. FIG. 12 illustrates a meaning map for a state q for a system that does not operate in accordance with a syntax file or the like. As shown in FIG. 12, a set $U_I$ of utterances $\{u_a, u_b, u_c \ldots \}$ map to the same input command $_1$. Another set $U_{II}$ of utterances $\{u_m, u_n, u_o \ldots \}$ map to a different input command $\sigma_2$ and so on. As with the previously described embodiment, utterances in a given state map to a particular input command. In this embodiment, the meaning maps for different states correlate the same utterance to different input commands so that a different meaning is assigned to the same utterance when used in different contexts.

The use of the meaning maps in accordance with the present invention wherein word representations whether in the form of utterances, i.e. literal text strings, and/or parse tags are correlated to the same or different input commands depending on the current context state allows the speech recognition manager of the present invention to accurately interpret speech. Further, the architecture of the present invention in which a meaning map alone or with a syntax file is provided for each context state, allows the system of the present invention to be easily updated by merely adding more meaning maps and syntax files for additional states. Thus, the syntax variety recognized and interpreted by the system of the present invention can easily be increased. However, the architecture of the present invention allows speech to be interpreted much more rapidly than heretofore possible. The present invention is extremely useful in head mounted systems for which it is desired to have hands free operation as described in detail herein. The speech recognition manager of the present invention is, however, applicable to any system for which speech is to be an input.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A speech recognition manager for a processing system operating in accordance with one or more application programs responsive to input commands, said manager receiving representations of one or more words from an acoustic processor that is responsive to sound to generate said word representations, said manager comprising:

a memory for storing data for a plurality of context states;

means for determining one context state as a current context state; and means responsive to said data stored in said memory for the one context state determined to be current for assigning to a word representation received from said acoustic processor a first meaning represented by a first input command when said current context state is determined to be a first context state and a second meaning represented by a second input command when said current context state is determined to be a second context state.

2. A speech recognition manager as recited in claim 1 wherein said memory stores for each context state, data correlating a word representation to a context state transition input command, said determining means being responsive to the assignment of a context state transition input command to a received word representation to determine a new current context state.

3. A speech recognition manager as recited in claim 2 wherein an application program implemented by said processing system generates a context state transition input command to which said determining means is responsive to determine a new current context state.

4. A speech recognition manager as recited in claim 1 wherein said memory stores for each context state one or more data tables correlating word representations to input commands.

5. A speech recognition manager as recited in claim 4 wherein said word representations are in the form of literal text strings.

6. A speech recognition manager as recited in claim 4 wherein said acoustic processor is responsive to a first data table to generate word representations in the form of parse tags in response to sound; said memory stores for each context state, data correlating a word representation to a context state transition input command; said determining means is responsive to the assignment of a context state transition input command to a received word representation to determine a new current context state; and said manager includes means responsive to a determination of a new current context state for loading the first data table for said new current context.

7. A speech recognition manager as recited in claim 1 wherein said memory stores for each context state a first data table correlating word representations in the form of literal text strings to word representations in the form of parse tags and said memory stores a second data table correlating word representations in the form of a sequence of one or more parse tags to an input command.

8. A speech recognition manager as recited in claim 1 wherein said memory stores for each context state a first data table correlating word representations in the form of utterances to parse tags and literal text strings, and said memory stores a second data table correlating parse tags and literal text strings to input commands.

9. A speech recognition manager for a processing system operating in accordance with one or more application programs responsive to input commands, said manager receiving representations of one or more words from an acoustic processor that is responsive to sound to generate said word representations using a data file that limits the word representations that can be generated, said manager comprising:

a memory for storing, for each of a plurality of context states, a data file that limits the word representations that can be generated for the context state and a meaning file that correlates word representations to input commands for the context state, at least one of said input commands being a context state transition input command;

means for determining one context state as the current context state;

means responsive to said meaning file for the determined current context state for assigning to a word representation received from said acoustic processor a first meaning represented by a first input command, said determining means being responsive to a context state transition input command to determine a new current context state.

10. A speech recognition manager as recited in claim 9 including means responsive to a determination of a new current context state for loading the data file for the new current context state to the acoustic processor to limit the word representations that can be generated.

11. A speech recognition manager as recited in claim 9 wherein an application program implemented by said processing system generates a context state transition input command to which said determining means is responsive to determine a new current context state.

12. A speech recognition manager as recited in claim 9 wherein said meaning file correlates word representations in the form of utterances to input commands.

13. A speech recognition manager as recited in claim 9 wherein said data file correlates word representations in the form of utterances to word representations in the form of parse tags and/or literal text strings and said meaning file correlates word representations in the form of a sequence of one or more parse tags and/or literal text strings to an input command.

14. A speech recognition manager as recited in claim 9 including means responsive to a determination of a new current context state for informing the user of the change of context state.

15. A speech recognition manager as recited in claim 14 wherein said informing means includes a display controlled in response to the determination of a new current context state to provide visual indicia to the user indicating the change.

16. A speech recognition manager as recited in claim 15 wherein said indicia identifies the new context state.

17. A speech recognition manager as recited in claim 15 wherein said informing means includes a speaker controlled in response to the determination of a new current context state to provide an audio message to the user indicating the change.

18. A system responsive to spoken utterances for carrying out actions, comprising:

a microphone to pick up speech;

a speech decoding system for generating word representations from speech;

a speech recognition manager for converting word representations received from said speech decoding system to input commands based upon one context state determined to be current at the time of receipt of a word representation by the speech recognition manager; and a processing system operating in accordance with one or more applications responsive to input commands from said speech recognition manager for implementing actions associated with said input commands wherein different actions are implemented in response to different input commands.

19. A system responsive to spoken utterances as recited in claim 18 wherein said recognition manager includes a memory for storing data for a plurality of context states; and means for determining a new current context state in response to a word representation that is converted to a context state transition input command.

20. A system responsive to spoken utterances as recited in claim 19 wherein said speech recognition manager further includes means responsive to said data stored in said memory for assigning to a word representation received from said speech decoding system a first meaning represented by a first input command when said current context state is determined to be a first context state and a second meaning represented by a second input command when said current context state is determined to be a second context state.

21. A system responsive to spoken utterances as recited in claim 19 wherein an application program implemented by said processing system generates a context state transition input command to which said determining means is responsive to determine a new current context state.

22. A system responsive to spoken utterances as recited in claim 21 wherein said word representations are in the form of literal strings.

23. A system responsive to spoken utterances as recited in claim 22 wherein said manager includes means responsive to a determination of a new current context state for loading said first data table for said new current context state into said speech decoding system.

24. A system responsive to spoken utterances as recited in claim 19 wherein said memory stores for each context state one or more data tables correlating word representations to input commands.

25. A system responsive to spoken utterances as recited in claim 19 wherein said memory stores for each context state a first data table correlating word representations in the form of utterances to word representations in the form of parse tags and/or literal text strings and said memory stores a second data table correlating word representations in the form of a sequence of one or more parse tags and/or literal text strings to an input command.

26. A system responsive to spoken utterances as recited in claim 18 wherein said speech decoding system includes a data file that limits the word representations that can be generated and said speech recognition manager includes:

a memory for storing for each of a plurality of context states, a data file that limits the word representations that can be generated for the context state and a meaning file that correlates word representations to input commands for the context state, at least one of said input commands being a context state transition input command;

means for determining one context state as a current context state; and means responsive to said meaning file for the determined current context state for assigning to a word representation received from said speech decoding system a first meaning represented by a first input command, said determining means being responsive to a context state transition input command to determine a new current context state.

27. A speech recognition manager as recited in claim 26 including means responsive to a determination of a new context state for loading the data file for the new current state to the acoustic processor to limit the word representations that can be generated.

28. A speech recognition manager as recited in claim 26 wherein an application program implemented by said processing system generates a context state transition command to which said determining means is responsive to determine a new current context state.

29. A speech recognition manager as recited in claim 26 wherein said meaning file correlates word representations in the form of literal text strings to input commands.

30. A speech recognition manager as recited in claim 26 wherein said data file correlates word representations in the form of utterances to word representations in the form of parse tags and/or literal text strings and said meaning file correlates word representations in the form of a sequence of one or more parse tags and/or literal text strings to an input command.

31. A speech recognition manager as recited in claim 26 including means responsive to a determination of a new current context state for informing the user of the change of context state.

32. A speech recognition manager as recited in claim 31 wherein said informing means includes a display controlled in response to the determination of a new current context state to provide visual indicia to the user indicating the change.

33. A speech recognition manager as recited in claim 32 wherein said indicia identifies the new context state.

34. A speech recognition manager as recited in claim 31 wherein said informing means includes a speaker controlled in response to the determination of a new current context state to provide an audio message to the user indicating the change.

35. A system responsive to spoken utterances as recited in claim 18 wherein said speech recognition manager includes a processor operating in accordance with speech recognition manager software and said processing system includes the same processor operating in accordance with the software for said one or more applications.

36. A system responsive to spoken utterances as recited in claim 35 wherein said second processor is remote form said first processor.

37. A system responsive to spoken utterances as recited in claim 35 wherein said second processor is non-remote from said first processor.

38. A system responsive to spoken utterances as recited in claim 35 wherein said first processor is coupled to a wireless communication system for communicating said input command to said second processor.

39. A system responsive to spoken utterances as recited in claim 35 wherein said first processor is coupled to a communication port for communication with said second processor via a wired connection.

40. A system responsive to spoken utterances as recited in claim 18 wherein said speech recognition manager includes a first processor operating in accordance with speech recognition manager software, said processing system includes a second processor operating in accordance with the software for said one or more applications, and said first and second processors are in communication.

* * * * *